(12) United States Patent
Burkholder et al.

(10) Patent No.: US 11,585,025 B2
(45) Date of Patent: *Feb. 21, 2023

(54) MICROPOROUS NANOFIBER FILMS

(71) Applicant: NXTNANO, LLC, Lenexa, KS (US)

(72) Inventors: Phillip Ross Burkholder, Tulsa, OK (US); Alan Smithies, Overland Park, KS (US)

(73) Assignee: NxtNano, LLC, Lenexa, KS (US)

(*) Notice: Subject to any disclaimer, the term of this patent is extended or adjusted under 35 U.S.C. 154(b) by 160 days.

This patent is subject to a terminal disclaimer.

(21) Appl. No.: 16/292,986

(22) Filed: Mar. 5, 2019

(65) Prior Publication Data

US 2019/0276668 A1    Sep. 12, 2019

Related U.S. Application Data

(60) Provisional application No. 62/640,233, filed on Mar. 8, 2018.

(51) Int. Cl.
*D04H 1/728*    (2012.01)
*D01D 5/00*     (2006.01)
(Continued)

(52) U.S. Cl.
CPC .......... *D04H 1/728* (2013.01); *D01D 5/0038* (2013.01); *D01D 5/28* (2013.01); *D04H 3/016* (2013.01);
(Continued)

(58) Field of Classification Search
CPC .......... D04H 1/728; D04H 3/16; D04H 3/147; D04H 3/153; D04H 3/016; D04H 1/4374;
(Continued)

(56) References Cited

U.S. PATENT DOCUMENTS 5,238,739 A * 8/1993 Susa .................. D01F 1/10
                                                    428/364
8,268,224 B2   9/2012 Kohinata et al.
(Continued)

FOREIGN PATENT DOCUMENTS

KR    20110095753    *  8/2011    ............... B82B 1/00
KR    101164947 B1  *  7/2012
(Continued)

OTHER PUBLICATIONS

Polyurethane Properties; efunda polymer (Year: 2021).*
Nylon Properties, Polymer Properties Database (Year: 2021).*

*Primary Examiner* — Jennifer A Steele
(74) *Attorney, Agent, or Firm* — Hovey Williams LLP

(57) ABSTRACT

The present invention generally relates to the design and manufacture of nanofiber layers, webs, films, or membranes that may be self-supporting and can function as standalone products. More particularly, the present invention relates to a microporous nanofiber films and the use of such films in a wide variety of products and applications, including applications where physical property tuning is typically limited. Generally, the microporous films of the present invention can function as a standalone nanofiber membrane or can be bonded to other microporous films to produce a layered stacked film stack with customizable properties. Unlike conventional microporous films available in today's market, the microporous films of the present invention can be lighter, require less raw material cost to produce, and can improve operating performances in a variety of applications.

19 Claims, 2 Drawing Sheets

(51) Int. Cl.
  *D04H 3/016*  (2012.01)
  *D04H 3/16*  (2006.01)
  *D04H 3/147*  (2012.01)
  *D04H 3/153*  (2012.01)
  *D01D 5/28*  (2006.01)
(52) U.S. Cl.
  CPC ............. *D04H 3/147* (2013.01); *D04H 3/153* (2013.01); *D04H 3/16* (2013.01)
(58) Field of Classification Search
  CPC ........ D04H 1/559; D04H 1/42; D04H 1/4358; D01D 5/0038; D01D 5/00; Y10T 442/60; D01F 8/00; B32B 5/022
  See application file for complete search history.

(56) References Cited

U.S. PATENT DOCUMENTS

| | | | |
|---|---|---|---|
| 10,799,820 B2 * | 10/2020 | Smithies | .................... B32B 5/08 |
| 2016/0168756 A1 * | 6/2016 | Gladish | .................... D04H 3/07 |
| | | | 428/221 |
| 2016/0243478 A1 * | 8/2016 | Park | ....................... D04H 1/728 |

FOREIGN PATENT DOCUMENTS

| | | | | |
|---|---|---|---|---|
| WO | WO-2008021293 A1 * | 2/2008 | | |
| WO | WO-2011015439 A1 * | 2/2011 | ......... | B01D 39/1623 |
| WO | WO-2016171328 A1 * | 10/2016 | ........... | D04H 1/4358 |

\* cited by examiner

MICROPOROUS NANOFIBER FILMS

RELATED APPLICATIONS

This application claims the priority benefit under 35 U.S.C. § 119(e) of U.S. Provisional Patent Application Ser. No. 62/640,233 entitled "MICROPOROUS NANOFIBER FILMS," filed Mar. 8, 2018, the entire disclosure of which is incorporated herein by reference.

BACKGROUND

1. Field of the Invention

The present invention generally relates to microporous films. More particularly, the present invention generally relates to microporous films comprising nanofibers.

2. Description of the Related Art

Presently, most nanofiber manufacturing technology and production equipment usually directly apply very thin, lightweight layers of nanofibers to other materials. Typically, the nanofiber layers have a very light basis weight and, consequently, they must be attached to other substrates in order to be functional.

In today's market, nanofibers are being increasingly used in various applications, such as in microfiltration, aural dampening, dielectrics, sound insulation, high-surface area wipes, medical applications such as micro-venting, and skin repair applications. Generally, films are produced by: (i) casting, stretching, or extruding a single-layer membrane and bonding the membrane to a non-woven substrate material using an adhesive or (ii) by producing the film directly onto a support substrate. However, each of these existing techniques exhibit a number of deficiencies and may detrimentally affect the film membranes that they form.

Accordingly, there is a need for an improved method to produce microporous films and to bond such films together.

SUMMARY

One or more embodiments of the present invention generally relate to a microporous film. Generally, the microporous film comprises an electrospun nanofiber having an average diameter of less than 1,000 nm. Furthermore, the microporous film comprises a basis weight of less than 50 gsm and an average pore diameter of less than 2.0 microns.

One or more embodiments of the present invention generally relate to a layered film stack. Generally, the layered film stack comprises: (a) a first microporous film comprising a first electrospun nanofiber having an average diameter of less than 1,000 nm and (b) a second microporous film comprising a second electrospun nanofiber having an average diameter of less than 1,000 nm. In such embodiments, the second microporous film can be bonded directly to the first microporous film.

One or more embodiments of the present invention generally relate to a method for producing microporous films. Generally, the method involves: (a) dissolving polymer A and optional polymer B in a solvent to form a spinning solution, wherein polymer A and optional polymer B both comprise the same type of polymer, polymer A exhibits melting point temperature A and optional polymer B exhibits melting point temperature B, and melting point temperature A is greater than melting point temperature B; and (b) electrospinning the spinning solution onto a substrate to thereby form an initial microporous film on at least a portion of a surface of the substrate. Furthermore, the microporous film comprises a nanofiber having an average diameter of less than 1,000 nm, wherein the nanofiber is formed from at least polymer A.

One or more embodiments of the present invention generally relate to a method for forming a layered film stack. Generally, the method involves: (a) providing a first microporous film comprising a first electrospun nanofiber having an average diameter of less than 1,000 nm; (b) providing a second microporous film comprising a second electrospun nanofiber having an average diameter of less than 1,000 nm; and (c) bonding the first microporous film and the second microporous film in the absence of an adhesive to thereby form the layered film stack.

BRIEF DESCRIPTION OF THE FIGURES

Embodiments of the present invention are described herein with reference to the following drawing figures, wherein.

DETAILED DESCRIPTION

Figure 1:
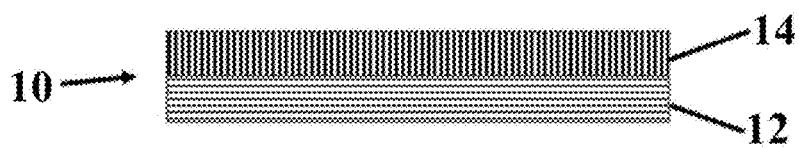
FIG. 1 demonstrates a bicomponent layered film stack according to one embodiment of the present invention.

The present invention generally relates to the design and manufacture of nanofiber layers, webs, films, or membranes that may be self-supporting and function as standalone products. More particularly, the present invention relates to a microporous nanofiber film and use of such films in a wide variety of products and applications, including applications where physical property tuning is typically limited. Generally, the microporous films of the present invention can function as a standalone nanofiber membrane or can be bonded to other microporous membranes to produce a layered stacked film stack with customizable properties. More particularly, in various embodiments, the microporous films forming the layered film stacks can comprise microporous films formed from the same or different polymer types, which can yield layered film stacks with layers that exhibit different surfaces, features, and/or attributes. As discussed in greater detail below, the present invention allows the functional properties of the microporous films to be tuned for certain properties and then combined with additional membranes or substrates with minimal changes to those properties.

Unlike conventional microporous films available in today's market, the microporous films of the present invention can be lighter, require less raw material cost to produce, and can improve operating performances in a variety of applications.

Furthermore, due to the unique compositional makeup of the microporous films of the present invention, the microporous films may be bonded to one another without the need for an external adhesive in certain embodiments. More particularly, in various embodiments, one of the advantages of the microporous films of the present invention is that they are capable of being bonded to one another without the use of an external adhesive due to the unique composition of the nanofibers forming the films. Unlike conventional nanofiber membranes, the microporous films of the present invention may utilize an internal adhesive that is present in the films in the form of a polymer having a low melting point. Consequently, the presence of this low melting point polymer in the microporous films can allow multiple layers of the films to be bonded with little physical deformation or property loss and without the need for an external adhesive. Furthermore, due to the use of this low melting point polymer in the microporous films, the microporous films of the present invention can be made with nanofibers that cannot typically be bonded without the use of external bonding processes, such as polyvinylidene fluoride (PVDF) or polyethersulfone (PESU).

The method for producing the microporous films and layered film stacks of the present invention, along with the properties of such films and stacks, are now described in greater detail below.

In various embodiments, the microporous films of the present invention are produced via an electrospinning process, which is capable of applying nanofibers directly to a temporary substrate, such as a release paper. In other words, during the electrospinning process, a nanofiber film is applied onto at least portion of a designated and temporary substrate, usually a release paper.

In various embodiments, the electrospinning step of the present invention involves dissolving a polymer for forming the nanofibers in a dissolution solvent to form a spinning solution. Thus, the spinning solution can comprise, consist essentially of, or consist of at least one nanofiber-forming polymer and a dissolution solvent.

In certain embodiments, the electrospinning step of the present invention involves dissolving a high melting point polymer (also referred to herein as "polymer A") and a low melting point polymer (also referred to herein as "polymer B") in a dissolution solvent to form a spinning solution. Thus, the spinning solution can comprise, consist essentially of, or consist of polymer A, polymer B, and a dissolution solvent. In such embodiments, the melting point temperature of polymer A can be greater than the melting point temperature of polymer B. As noted above, the low melting point polymer (polymer B) used in forming the nanofibers in these embodiments can function as an internal adhesive in the microporous films.

Generally, the base polymers in an electrospinning process for producing nanofibers, such as nylon or PVDF, must be soluble in a solvent or in an acid in preparation for fiber spinning. For example, nylon nanofibers are generally spun from a solution of nylon polymer dissolved in formic acid and PVDF nanofibers are generally spun from PVDF dissolved in dimethyl-acetamide or DMAc. Conventional electrospinning machinery known in the art may be used to carry out the electrospinning step.

In one or more embodiments, the dissolution solvent comprises formic acid, dimethylacetamide (DMAc), dimethylformamide, or mixtures thereof. In certain embodiments, the solvent comprises at least dimethylformamide. Generally, the spinning solution can comprise a total solids contents of at least 1, 5, or 10 and/or not more than 50, 40, 30, or 20 weight percent as measured by the total weight of the solution.

In one or more embodiments, the resulting microporous films can be formed with a monocomponent nanofiber. As used herein, "monocomponent nanofiber" refers to a nanofiber formed from a single polymer.

In alternative embodiments, the resulting microporous films can be produced with a multicomponent fiber. As used herein, a "multicomponent fiber" refers to a nanofiber formed from at least two polymers. As noted above, the nanofibers forming the microporous films of the present invention may be formed from at least two polymers having different melting point ($T_m$) temperatures.

In various embodiments, the microporous films may comprise a multicomponent nanofiber formed from a high melting point polymer (also referred to herein as "polymer A") and a low melting point polymer (also referred to herein as "polymer B").

In one or more embodiments, the high melting point polymer (polymer A) has a melting point temperature of at least about 120, 130, 140, 150, 160, 165, or 170° C. Additionally or alternatively, polymer A can have a melting point temperature of less than about 250, 225, or 200° C.

In one or more embodiments, the low melting point polymer (polymer B) has a melting point temperature of at least about 80, 90, 100, 110, or 120° C. Additionally or alternatively, polymer B can have a melting point temperature of less than about 190, 180, 170, 160, 150, 140, or 130° C.

In embodiments where two or more polymers are present in the spinning solution, the nanofibers formed from the electrospinning step can be in the form of multicomponent fibers. In such embodiments, the nanofibers can comprise, consist essentially of, or consist of the high melting point polymer (polymer A) and the low melting point polymer (polymer B). Alternatively, only a single polymer may be present in the spinning solution to thereby produce a monocomponent nanofiber.

In various embodiments, the multicomponent nanofiber can comprise a weight percentage of the high melting point polymer (polymer A) that is greater than the weight percentage of the low melting point polymer (polymer B). Alternatively, the multicomponent nanofiber can comprise a weight percentage of polymer A that is less than the weight percentage of polymer B.

In various embodiments, the multicomponent nanofiber can comprise at least 1, 5, 10, 20, 30, 40, 50, 60, 70, 80, or 85 weight percent of the high melting point polymer (polymer A). Additionally or alternatively, the multicomponent nanofiber can comprise less than 99, 95, 90, 85, 80, 75, 70, 65, 60, 55, or 50 weight percent of polymer A.

In various embodiments, the multicomponent nanofiber can comprise at least 1, 5, 10, or 15 weight percent of the low melting point polymer (polymer B). Additionally or alternatively, the multicomponent nanofiber can comprise less than 50, 40, or 30 weight percent of polymer B.

In various embodiments, polymer A and polymer B can both comprise the same type of polymer. As used herein, "both comprise the same type of polymer" means that polymer A and polymer B are polymers formed using the same type of monomers. For example, polymer A and polymer B can both be considered thermoplastic polyurethane polymers ("TPU") that are formed from the same or similar types of TPU monomers. Consequently, both polymer A and polymer B would be considered TPU polymers and, therefore, would both comprise the same type of polymer in this exemplary embodiment. However, it should be noted that while polymer A and polymer B may comprise the same type of polymer, these polymers may exhibit different properties that commonly distinguish polymers of the same type. For instance, polymer A and polymer B, despite being formed from the same or similar types of monomers, may comprise different degrees of polymerization, different molecular weights, different physical properties, different visual properties, and/or different chemical properties.

In alternative embodiments, polymer A and polymer B can comprise different types of polymers. For example, polymer A could be a thermoplastic polyurethane polymer ("TPU") and polymer B could be a polyethersulfone (PESU).

The polymers used to produce the monocomponent nanofibers or the multicomponent nanofibers can comprise any polymer that is capable of being electrospun. In various embodiments, the polymers used to produce the nanofibers, such as polymer A and polymer B, can comprise thermoplastic polymers selected from the group consisting of thermoplastic polyurethanes (TPU), polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene fluoride (PVDF), polyethersulfone (PESU), polyvinylidene chloride, polyvinyl butylene, polyacetal, polyamide, polyester, polyolefins, cellulose ethers, cellulose esters, polyalkylene sulfide, polyarylene oxide, polysulfone, modified polysulfone polymers, and combinations thereof.

In certain embodiments, the present invention uses thermoplastic polyurethane (TPU), polyvinylidene fluoride (PVDF), and/or polyethersulfone (PESU) to produce the nanofibers. Thus, in embodiments where a multicomponent nanofiber is produced, polymer A and polymer B of the multicomponent nanofiber could both comprise TPU, PVDF, and/or PESU polymers. Alternatively, in embodiments where monocomponent nanofibers are used, such nanofibers could be produced entirely from TPU, PVDF, or PESU polymers.

In one or more embodiments, the present invention uses TPU polymers that can be supplied by various suppliers such as BASF, Bayer, and DuPont. For example, the TPU polymers can include those made by Lubrizol under the brand name Estane®, with each polymer having a melt point of 120° C. and 170° C., respectively. Generally, although not wishing to be bound by theory, the solvent used in the electrospinning step to render the TPU soluble is dimethylformamide.

Next, the aforementioned spinning solution can be electrospun on at least one or more surfaces of a temporary substrate, such as a release paper. In such embodiments, the spinning solution can be coated on at least a portion of a surface of the substrate or on the entire surface of the substrate. It should be noted that the temporary substrate can comprise any natural or synthetic substrate known in the art. In various embodiments, the substrate can comprise cellulose, lyocell, glass, polyester, polyamide, polyolefin, thermoplastic polyurethane, polyetherimide, polyphenyl ether, polyphenylene sulfide, polysulfone, aramid, polypropylene, or mixtures thereof. Furthermore, the substrate can comprise a wet-laid, dry-laid, spunbond, or needlefelt substrate. In one or more embodiments, the synthetic substrate comprises a basis weight of at least 10, 50, or 70 gsm and/or not more than 500, 400, 300, or 260 gsm.

In various embodiments, the formed microporous film may be removed from the temporary substrate once it has solidified. The separated microporous films represent the microporous films of the present invention.

The electrospinning process can produce nanofibers with average diameters ranging from 150 to 1,000 nm with a very narrow distribution, thereby allowing the performance properties of the microporous films to be tuned for airflow and weight. For instance, the nanofibers in the microporous films can comprise an average diameter of less than 1,000, 800, 600, 500, 400, 300, or 200 nm. Additionally or alternatively, the nanofibers in the microporous films can have an average diameter of at least 1, 10, 50, 100, 150, or 200 nm. In certain embodiments, the nanofibers forming the microporous films can have an average diameter of about 200 to 350 nm or about 200+/−50 nm. Generally, the fiber diameter can be tuned using processing parameters and total solid composition to create the preferred permeability for a given membrane weight.

Although the nanofibers may be in the form of multicomponent fibers, the nanofibers may not comprise a defined cross-sectional shape for polymer A and polymer B (e.g., sheath/core, segmented pie, islands-in-sea, ribbon, etc.); rather, polymer A and polymer B can be randomly positioned throughout the nanofibers. In such embodiments, the nanofibers may be considered random nanofibers. As used herein, "random nanofibers" refer to multicomponent fibers having no defined shape for the components contained therein. In certain embodiments, the nanofibers can have a substantially round cross-sectional shape.

In various embodiments, the nanofibers can have an aspect ratio (i.e., length to diameter) of at least 10:1, 50:1, 100:1, 500:1 or 1,000:1.

In various embodiments, the microporous films can comprise a basis weight of at least 1, 2, 3, 4, or 5 gsm and/or less than 50, 40, 30, 25, 20, 15, or 10 gsm. In certain embodiments, the microporous films can comprise a basis weight in the range of 5 to 25 gsm.

In various embodiments, additives may be added to the spinning solutions in order to enhance specific properties of the resulting microporous films, such as hydrocarbon sequestration, increased or decreased flux, hydrophobicity, and/or electrical properties.

In various embodiments, the microporous films of the present invention can exhibit an air permeability of at least 0.1, 0.15, 0.2, 0.25, 0.3, or 0.35 cfm and/or less than 0.8, 0.7, 0.6, or 0.5 cfm as measured according to ASTM D737.

In various embodiments, the microporous films of the present invention can comprise an average pore diameter of at least 0.01, 0.05, 0.1, 0.2, 0.3, 0.4, 0.5, 0.6, 0.7, 0.8, 0.9, or 1.0 µm and/or less than 2.0, 1.9, 1.8, 1.7, 1.6, 1.5, 1.4, 1.3, or 1.2 µm as measured according to the Bubble Point Test (ASTM 316-80).

As noted above, the microporous films of the present invention can be used by themselves as standalone films without being bonded to other microporous films or other types of support membranes. This is in contrast to other nanofiber films produced and utilized in the present market, which must be combined with a heavier substrate in order to be used in various applications. Unlike conventional nanofiber films, the microporous films of the present application can be used by themselves without the need for a rigid support.

Alternatively, the microporous films of the present invention can be bonded to other microporous films, including those of the present invention, in order to produce a layered film stack. In such embodiments, the low melting point polymer used in forming the multicomponent nanofibers can function as an internal adhesive in the microporous films and can facilitate the bonding between the layers in the layered film stack without the need for an additional, external adhesive.

In various embodiments, the layered film stacks can comprise at least 2, 3, 4, 5, 6, 7, or 8 microporous films of the present invention. These additional microporous films can also be produced according to the methods described herein and, therefore, may be formed from monocomponent nanofibers or multicomponent nanofibers comprising a high melting point component (i.e., the high melting point polymer) and a low melting point component (i.e., the low melting point polymer).

Additionally or alternatively, in certain embodiments, the layered film stacks may also comprise other types of membranes or layers that are not microporous films. For example, the layered film stacks may comprise at least 1, 2, 3, 4, or 5 non-microporous membranes or films.

Generally, a thermal lamination method may be used to bond the microporous films together when forming the layered film stacks. Although not wishing to be bound by theory, when using the above-referenced multicomponent nanofibers, it is believed that the low melting point polymer (polymer B) will at least partially melt during the lamination step, thereby creating an internal adhesive, while the high melting point polymer (polymer A) of the nanofiber will stay intact. Thus, the at least partially melted low melting point polymer (polymer B) in the nanofibers can be used to bond the microporous films together during the lamination step.

In various embodiments, in order to optimize the bond between two or more microporous films comprising the above-referenced multicomponent nanofibers, the lamination step generally occurs between the melting temperature of polymer A (e.g., a high melt TPU polymer) and the melting temperature of polymer B (e.g., a low melt TPU polymer). For example, if the melting point of polymer A is 170° C. and the melting temperature of polymer B is 120° C., then the ideal temperature for the lamination step would be about 145° C. Although not wishing to be bound by theory, this offset in melting temperature becomes critical as the lower melting point components in the nanofibers (i.e., the polymer B components) actually soften and bond to each other; however, the high melting point components of the nanofibers (i.e., the polymer A components) remain unaffected and retain their dimension, consistency, and uniformity under the thermal and mechanical loading of the lamination process.

In embodiments where layered film stacks are produced with at least two microporous films of the present invention, the polymers used to produce each microporous film can be the same polymer type or, alternatively, the microporous films in the layered film stack can be made from different polymer types and additives depending on the application. For example, a layered film stack could be produced with two microporous films of the present invention that are produced with different polymer types. The properties of these layered film stacks can be modified and adjusted according to the microporous films used to produce the film stacks. In various embodiments, these layered film stacks may be considered bicomponent or multicomponent films in that they may comprise two or more films that each express different properties and functionalities (e.g., hydrophobicity, hydrophilicity, coalescing, charged, etc.).

An exemplary embodiment of a bicomponent nanofiber film is depicted in FIG. 1, which depicts a layered film stack 10 comprising a first microporous film 12 that exhibits an open, air permeable hydrophobic structure made from one polymer type, such as a specific grade of TPU polymer, and a second microporous film 14 that exhibits an air permeable hydrophilic structure made from a different polymer type, such as a very durable, high strength TPU polymer. Thus, the properties of the layered film stacks of the present invention can be very customizable depending on the desired application of the film stack.

The layered film stacks of the present invention can comprise a combined basis weight of at least 5, 10, 15, or 20 gsm and/or less than 300, 200, 150, 100, 90, 80, 70, 60, 50, 40, or 30 gsm.

The microporous films and the layered film stacks produced therefrom can be used in a variety of applications. For instance, the microporous films can be used in microfiltration, noise dampening, aural dampening, dielectric applications, medical applications, and/or antimicrobial applications. Furthermore, because nanofiber films are much thinner and more uniform than cast or extruded films, these films generally possess many attributes that can overcome limitations found with other technologies. For example, a thinner film in microfiltration applications can offer improved higher liquid flux, lower pressure drop, longer life, and lower cost. Another example would be in electrical insulation where a nanofiber film versus a wetlaid media would be much thinner and would offer improved dielectric performance and cost.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

Figure 2:
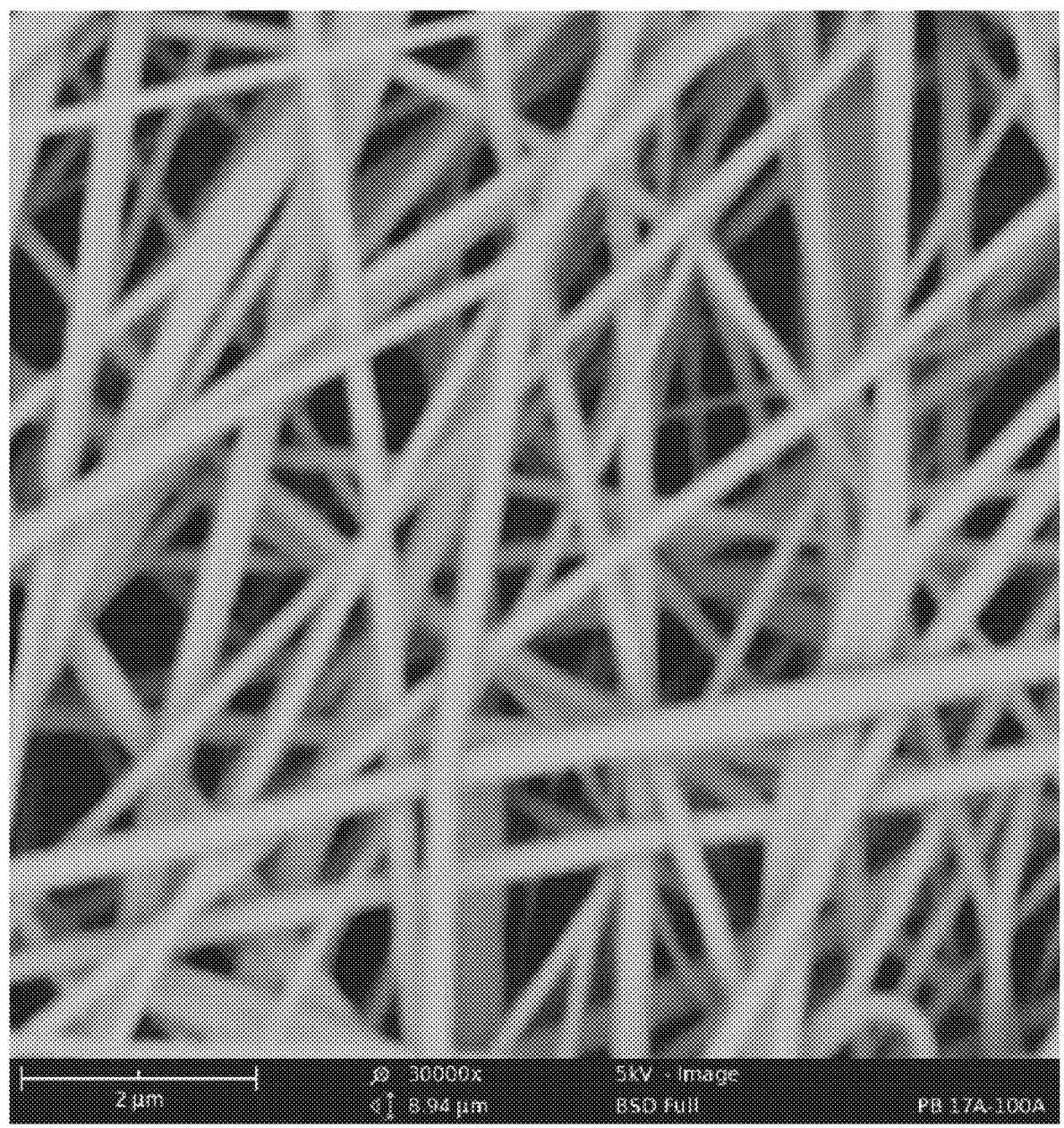
FIG. 2 is a micrograph of a PVDF microporous film before thermal lamination.
Figure 3:
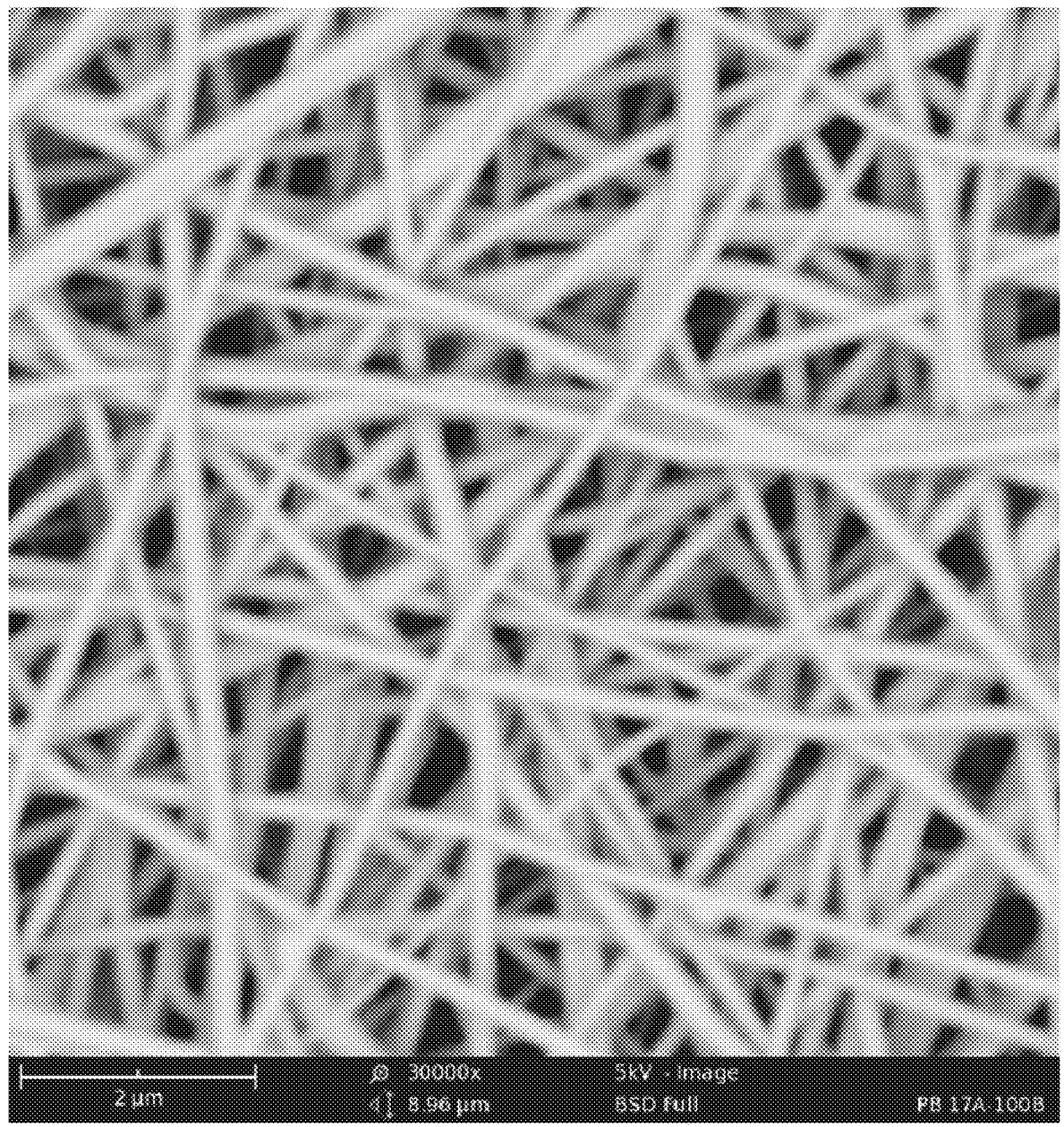
FIG. 3 is a micrograph of a PVDF microporous film after thermal lamination.

FIGS. 2 and 3 show a PVDF microporous membrane before and after thermal lamination, respectively. As depicted in FIG. 3, the PVDF nanofibers show little to no degradation due to the heat treatment used during lamination. Because the high melting point component in the PVDF nanofibers are not altered during the thermal lamination process, the air permeability does not change when the processing parameters are changed from 130° C. to 150° C. or 43 PLI to 50 PLI. For the present invention using PVDF polymer, the air permeability for a 16.50 gsm 2-layer membrane can be consistently in the range of 0.35 to 0.45 cfm over the range of lamination conditions.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the terms "first," "second," "third," and the like, along with the terms "Polymer A," "Polymer B," "Polymer C," and "Polymer D," are used to describe various elements and such elements should not be limited by these terms. These terms are only used to distinguish one element from another and do not necessarily imply a specific order or even a specific element. For example, an element may be regarded as a "first" element in the description and a "second" element in the claims without departing from the scope of the present invention. Consistency is maintained within the description and each independent claim, but such nomenclature is not necessarily intended to be consistent therebetween.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Claims Not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A standalone microporous film consisting of a single layer, said standalone microporous film comprising an electrospun nanofiber having an average diameter of 10 to 500 nm;
   wherein said standalone microporous film comprises a basis weight of less than 50 gsm,
   wherein said standalone microporous film exhibits an air permeability of at least 0.1 cfm as measured according to ASTM D737,
   wherein said electrospun nanofibers are formed from polymer A and polymer B, wherein said electrospun nanofiber is formed from thermoplastic polyurethane (TPU), polyacrylonitrile, polyvinylidene fluoride (PVDF), polyethersulfone (PESU), or polystyrene, and wherein polymer A and polymer B have different melting points,
   wherein said standalone microporous film comprises an average pore diameter of less than 2.0 microns.

2. The standalone microporous film of claim 1, wherein said electrospun nanofiber is formed from thermoplastic polyurethane (TPU).

3. The standalone microporous film of claim 1, wherein said electrospun nanofiber:
   (i) comprises polymer A and polymer B,
   (ii) said polymer A has a higher melting point temperature than said polymer B,
   (iii) said polymer A exhibits a melting point temperature in the range of 150 to 250° C., and
   (iv) said polymer B exhibits a melting point temperature in the range of 80 to 150° C.,
   wherein the weight percentage of said polymer A in said electrospun nanofiber is greater than the weight percentage of said polymer B in said electrospun nanofiber.

4. The standalone microporous film of claim 1, wherein said standalone microporous film comprises an average pore diameter of less than 1.0 micron and a basis weight of less than 20 gsm.

5. The microporous film of claim 1, wherein the electrospun nanofiber:
   (i) comprises polymer A and polymer B,
   (ii) said polymer A has a higher melting point temperature than said polymer B,
   (iii) said polymer A exhibits a melting point temperature in the range of 150 to 250° C.,
   (iv) said polymer B exhibits a melting point temperature in the range of 80 to 150° C., and
   (v) said polymer A and said polymer B comprise thermoplastic polyurethane (TPU), polyacrylonitrile, polyethersulfone (PESU), or polystyrene.

6. The standalone microporous film of claim 3, wherein said electrospun nanofiber comprises 70 to 99 weight percent of polymer A and 1 to 30 weight percent of polymer B.

7. The standalone microporous film of claim 1, wherein said electrospun nanofiber comprises a random nanofiber.

8. The standalone microporous film of claim 1, wherein said standalone microporous film consists of said electrospoun nanofiber.

9. The standalone microporous film of claim 1, wherein said electrospun nanofiber has an average diameter of 10 to 250 nm.

10. A layered film stack, said film stack comprising:
    (a) a first standalone microporous film consisting of a single layer, wherein said first standalone microporous film comprises a first electrospun nanofiber having an average diameter of 10 to 500 nm, wherein said first standalone microporous film comprises a basis weight of less than 50 gsm and an average pore diameter of less than 2.0 microns, wherein said first electrospun nanofiber and said second electrospun nanofiber are formed from thermoplastic polyurethane (TPU), polyacrylonitrile, polyvinylidene fluoride (PVDF), polyethersulfone (PESU), or polystyrene, and wherein said first standalone microporous film exhibits an air permeability of at least 0.1 cfm as measured according to ASTM D737; wherein said first electrospun nanofiber: (i) comprises polymer A and polymer B, (ii) said polymer A has a higher melting point temperature than said polymer B, (iii) said polymer A exhibits a melting point temperature in the range of 150 to 250° C., and (iv) said polymer B exhibits a melting point temperature in the range of 80 to 150° C., wherein the weight percentage of said polymer A in said first electrospun nanofiber is greater than the weight percentage of said polymer B in said first electrospun nanofiber; and
    (b) a second standalone microporous film consisting of a single layer, wherein said second standalone microporous film comprises a second electrospun nanofiber having an average diameter of less than 1,000 nm, wherein said second electrospun nanofiber: (i) comprises polymer C and polymer D, (ii) said polymer C has a higher melting point temperature than said polymer D, (iv) said polymer C exhibits a melting point temperature in the range of 150 to 250° C., and (v) said polymer D exhibits a melting point temperature in the range of 80 to 150° C., wherein the weight percentage of said polymer C in said second electrospun nanofiber is greater than the weight percentage of said polymer D in said second electrospun nanofiber;

wherein said second standalone microporous film is bonded to said first standalone microporous film.

11. The layered film stack of claim 10, wherein said layered film stack does not comprise an adhesive.

12. The layered film stack of claim 10, wherein said first electrospun nanofiber and said second electrospun nanofiber are formed from thermoplastic polyurethane (TPU).

13. The layered film stack of claim 10, wherein said first standalone microporous film comprises a basis weight of less than 20 gsm and said second standalone microporous film comprises a basis weight of less than 20 gsm.

14. The layered film stack of claim 10, wherein said layered film stack comprises a basis weight of less than 50 gsm.

15. A method for producing a standalone microporous film consisting of a single layer, said method comprising:
(a) dissolving polymer A and polymer B in a solvent to form a spinning solution, said polymer A exhibits melting point temperature A and said polymer B exhibits melting point temperature B, and said melting point temperature A is greater than said melting point temperature B, wherein said polymer A and said polymer B comprise thermoplastic polyurethane (TPU), polyacrylonitrile, polyvinylidene fluoride (PVDF), polyethersulfone (PESU), or polystyrene; and
(b) electrospinning said spinning solution onto a substrate to thereby form an initial microporous film on at least a portion of a surface of said substrate,
wherein said standalone microporous film comprises a nanofiber having an average diameter of 10 to 500 nm,
wherein said nanofiber comprises said polymer A and said polymer B,
wherein said standalone microporous film comprises a basis weight of less than 50 gsm and an average pore diameter of less than 2.0 microns, and
wherein said standalone microporous film exhibits an air permeability of at least 0.1 cfm as measured according to ASTM D737.

16. The method of claim 15, wherein said solvent comprises formic acid, dimethylacetamide (DMAc), or dimethylformamide.

17. The method of claim 15, wherein said melting point temperature A is in the range of 150 to 250° C. and said melting point temperature B is in the range of 80 to 150° C.

18. A method for forming a layered film stack, said method comprising:
(a) providing a first standalone microporous film consisting of a single layer, wherein said first standalone microporous film comprises a first electrospun nanofiber having an average diameter of 10 to 500 nm, wherein said first standalone microporous film comprises a basis weight of less than 50 gsm and an average pore diameter of less than 2.0 microns, wherein said first standalone microporous film exhibits an air permeability of at least 0.1 cfm as measured according to ASTM D737; wherein said first electrospun nanofiber: (i) comprises polymer A and polymer B, (ii) said polymer A has a higher melting point temperature than said polymer B, (iii) said polymer A exhibits a melting point temperature in the range of 150 to 250° C., and (iv) said polymer B exhibits a melting point temperature in the range of 80 to 150° C., wherein the weight percentage of said polymer A in said first electrospun nanofiber is greater than the weight percentage of said polymer B in said first electrospun nanofiber; and
(b) providing a second standalone microporous film consisting of a single layer, wherein said second standalone microporous film comprises a second electrospun nanofiber having an average diameter of less than 1,000 nm; and wherein said second electrospun nanofiber: (i) comprises polymer C and polymer D, (ii) said polymer C has a higher melting point temperature than said polymer D, (iii) said polymer C exhibits a melting point temperature in the range of 150 to 250° C., and (iv) said polymer D exhibits a melting point temperature in the range of 80 to 150° C., wherein the weight percentage of said polymer C in said second electrospun nanofiber is greater than the weight percentage of said polymer D in said second electrospun nanofiber
(c) bonding said first standalone microporous film and said second standalone microporous film in the absence of an adhesive to thereby form said layered film stack, wherein said first electrospun nanofiber and said second electrospun nanofiber are formed from thermoplastic polyurethane (TPU), polyacrylonitrile, polyvinylidene fluoride (PVDF), polyethersulfone (PESU), or polystyrene.

19. The method of claim 18, wherein said bonding of step (c) comprises a thermal lamination step that occurs at a temperature below the melting points of said polymer A and said polymer C and above the melting points of said polymer B and said polymer D.

* * * * *